(12) United States Patent
Mathur et al.

(10) Patent No.: US 11,412,050 B2
(45) Date of Patent: Aug. 9, 2022

(54) ARTIFICIAL REALITY SYSTEM WITH VIRTUAL WIRELESS CHANNELS

(71) Applicant: Facebook Technologies, LLC, Menlo Park, CA (US)

(72) Inventors: Alok Kumar Mathur, Cupertino, CA (US); Gang Lu, Pleasanton, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/790,331

(22) Filed: Feb. 13, 2020

(65) Prior Publication Data

US 2021/0152643 A1    May 20, 2021

Related U.S. Application Data

(60) Provisional application No. 62/938,091, filed on Nov. 20, 2019.

(51) Int. Cl.
*H04L 67/141* (2022.01)
*G06F 9/54* (2006.01)
*H04L 67/131* (2022.01)
*H04L 67/104* (2022.01)

(52) U.S. Cl.
CPC .............. *H04L 67/141* (2013.01); *G06F 9/54* (2013.01); *H04L 67/104* (2013.01); *H04L 67/38* (2013.01)

(58) Field of Classification Search
CPC ..... H04L 67/141; H04L 67/104; H04L 67/38; G06F 9/54
See application file for complete search history.

(56) References Cited

U.S. PATENT DOCUMENTS

| 2004/0037313 A1* | 2/2004 | Gulati | H04L 12/56 370/465 |
| 2006/0165099 A1* | 7/2006 | Doherty | H04L 49/15 370/397 |
| 2011/0173258 A1* | 7/2011 | Arimilli | G06F 15/16 709/204 |

FOREIGN PATENT DOCUMENTS

WO    2016105863 A1    6/2016

OTHER PUBLICATIONS

International Search Report and Written Opinion of International Application No. PCT/US2020/056202, dated Jan. 21, 2021, 9 pp.
(Continued)

*Primary Examiner* — Kristie D Shingles
(74) *Attorney, Agent, or Firm* — Shumaker & Sieffert, P.A.

(57) ABSTRACT

In general, the disclosure describes techniques for wireless communications between multiple devices of an artificial reality system using virtual channels. In one example, a first computing device of a multi-device system, comprising: one or more first processors coupled to one or more memory devices; and a supervisory processor configured to establish a plurality of virtual channels over a physical wireless channel between the first computing device and a second computing device, wherein each of the virtual channels is associated with a different pair of processors comprising a source processor selected from one of the first processors or second processors of the second computing device and a destination processor selected from one of the first processors or the second processors, wherein, for each virtual channel and associated pair of processors, the source processor is configured to communicate application data with the destination processor using the virtual channel.

20 Claims, 13 Drawing Sheets

(56) References Cited

OTHER PUBLICATIONS

International Preliminary Report on Patentability for International Application No. PCT/US2020/056202, dated Jun. 2, 2022, 8 pages.

* cited by examiner

ARTIFICIAL REALITY SYSTEM WITH VIRTUAL WIRELESS CHANNELS

This application claims the benefit of U.S. Provisional Patent Application No. 62/938,091, filed Nov. 20, 2019, the entire contents of which are incorporated herein by reference.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes techniques for wireless communications between multiple devices of an artificial reality system. For example, the techniques may be applied for communications between a head-mounted device (HMD) and an external device, such as a peripheral device operating as a co-processor when paired with the HMD. Such wireless communication may be used, e.g., to send video or other media frames from the peripheral device to the HMD for rendering as artificial reality content.

In some examples, each of the devices of the AR system may include one or more processors that generate and consume application data. The devices establish one or more virtual channels for wireless communications over a physical wireless channel (e.g., a frequency channel), by which pairs of these processors, each of the processors belonging to a separate one of the devices, may exchange application data. As such, each virtual channel enables point-to-point communication between individual processors located on different devices of the AR system. Virtual channels may be implemented using different sets of features, such as different encryption policies, security key-pairs, qualities of service, etc. The devices execute a virtual channel protocol that uses header information for wirelessly transmitted fragments to specify which features to apply and to identify a destination processor. Accordingly, each virtual channel may be independently encrypted/decrypted to provide secure communications between pairs of processors with reduced—and in some cases, minimal—copying of packetized data within each device of the AR system.

In some examples, each of the devices includes a wireless handler, which may include one or more processors, a supervisory processor, an encryption engine, memory, and/or a wireless NIC, and the wireless handler is capable of inter-processor communication. The wireless handler is responsible for establishing and managing the virtual channels by which data is transmitted/received. Once a virtual channel is established, e.g., by the supervisory processor, the wireless handler on one device sends payload data with low overhead on the virtual channel to a counterpart wireless handler on another device. The counterpart wireless handler manages delivery to the destination processor based on the identity of the virtual channel or on an identity of the destination processor, as specified in the header information. As such, any processors communicating data in accordance with the virtual channel protocol do not need to comply with or understand any intermediate protocol.

The techniques may provide one or more technical advantages or improvements that provide at least one practical application. Communicating wirelessly using a typical communication protocol may be inefficient in a multi-device system, such as AR system; for one reason, processing attribute data for intermediate protocols (e.g., TCP/IP) may cause latencies. A virtual channel communication protocol as described herein allows a device in the AR system to operate around the intermediate protocols. As another advantage, while the typical communication protocol transports a payload of input data in the form of units called packets, the wireless handler may in some cases transform the payload in packet form into smaller units referred to as fragments. The wireless handler determines a number of fragments a packet will be split into based on packet size and generates multiple headers such that each fragment has a header. The wireless hander independently encrypts each of the fragments (payload data+header data) and sends the encrypted fragment to the counterpart wireless device on the physical wireless communication link. For each received encrypted fragment, the receiving wireless handler identifies the destination processor from the header information and, after decrypting, slots the fragment into a location in the buffer commensurate with the position of the fragment in the application payload. Because the destination processor may thereafter read the fragment directly from the location in the buffer, this technique may avoid further data copying at the application layer. Once the packet is fully formed by receiving all of the fragments, the wireless handler delivers the application data to the destination processor using inter-processor communication. Fragmentation and reassembly in this way may improve the reliability of wireless transmission to support, e.g., transmission of compressed video frames.

In one example, a method includes establishing, by a supervisory processor, a plurality of virtual channels over a physical wireless channel between a first computing device and a second computing device of a multi-device system, wherein each of the virtual channels is associated with a different pair of processors comprising a source processor selected from one of the first processors or second processors of the second computing device and a destination processor selected from one of the first processors or the second processors, wherein the first processors is coupled to one or more memory devices, and for each virtual channel and associated pair of processors, communicating application data from the source processor of the pair of processors to the destination processor of the pair of processors using the virtual channel. In another example, a computing device implements the above-described method.

Other examples include methods, devices, devices comprising means, and computer-readable storage media for performing any of the methods of the claims, or any of the processes, techniques, or procedures described herein.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters refer to like elements throughout the figures and text.

DETAILED DESCRIPTION

Figure 1A:
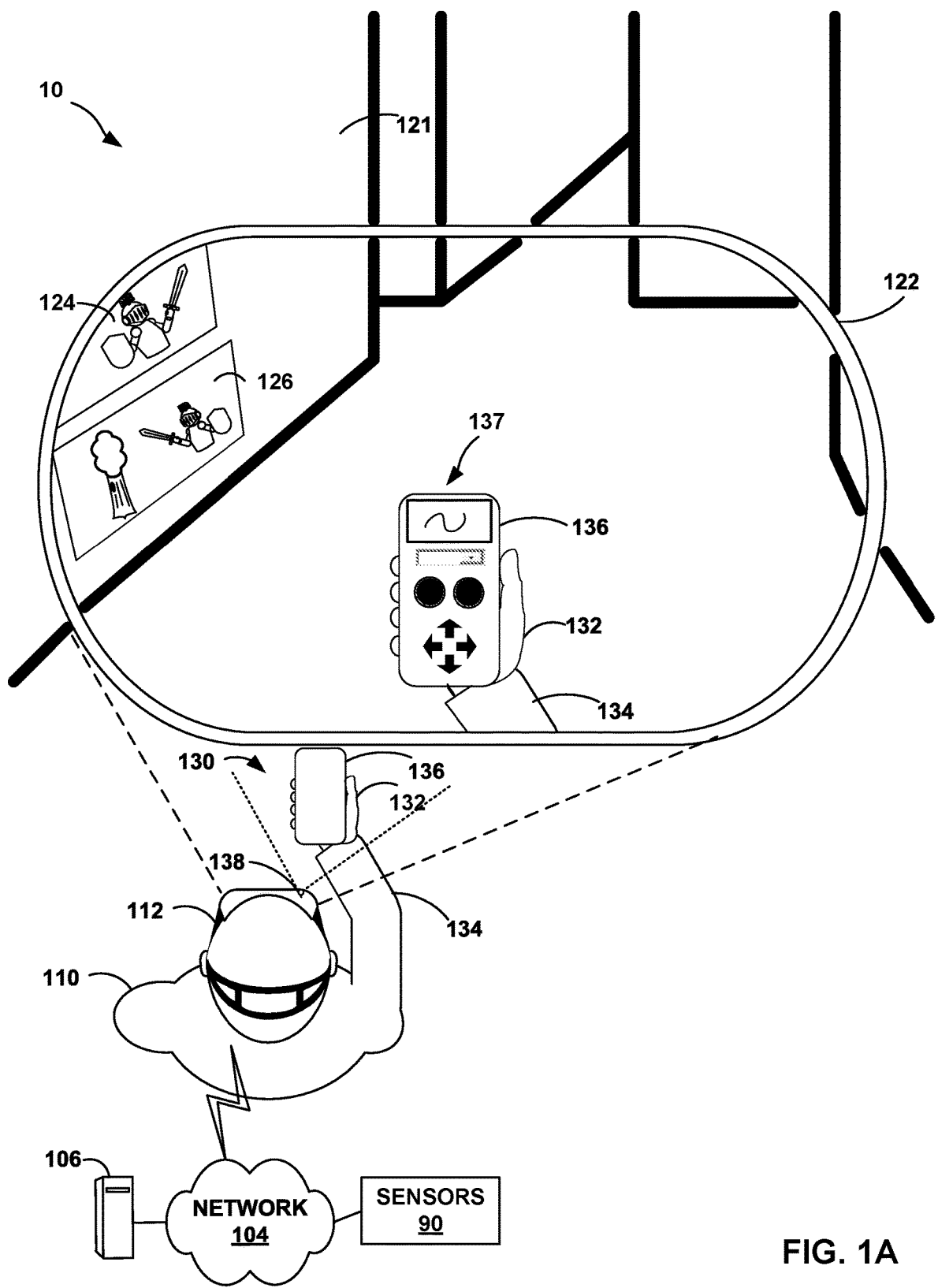
FIG. 1A is an illustration depicting an example multi-device artificial reality system that uses virtual channels to provide wireless communications between pairs of processors executing in multiple devices, in accordance with the techniques described in this disclosure.

FIG. 1A is an illustration depicting an example multi-device artificial reality system that utilizes virtual channels to provide wireless communications between pairs of processors executing in multiple devices, in accordance with the techniques described in this disclosure. In the example of FIG. 1A, artificial reality system 10 includes HMD 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

Peripheral device 136 operates as a co-processor for HMD 112 that, e.g., generates artificial reality content for transmission to and display by HMD 112. In this illustrated example, peripheral device 136 is a physical, real-world device that also has a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction to execute one or more artificial reality applications, where each device may be a separate physical electronic device and/or separate integrated circuits (e.g., System on a Chip (SOC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In accordance with the techniques of this disclosure, artificial reality system 10 may provide virtual channels for wireless communications between multiple devices, such as peripheral device 136 operating as a co-processing AR device when operationally paired with one or more HMDs, e.g., HMD 112. Although the techniques described herein are described with respect to virtual channels for wireless communications between a peripheral device 136 and one or more HMDs, the techniques may apply to any devices that may be paired in AR system 10.

In some example implementations, as described herein, peripheral device 136 and HMD 112 may each include one or more System on a Chip (SoC) integrated circuits configured to support an artificial reality application, such as SoCs operating as co-application processors, sensor aggregators, display controllers, etc. When peripheral device 136 and HMD 112 engage in wireless communications, components within peripheral device 136 and HMD 112 may provide virtual channels to provide wireless communications between pairs of processors executing in multiple devices. Each processor within each of peripheral device 136 and HMD 112 may require that each other of the processors be identified by a supervisory processor.

Figure 1B:
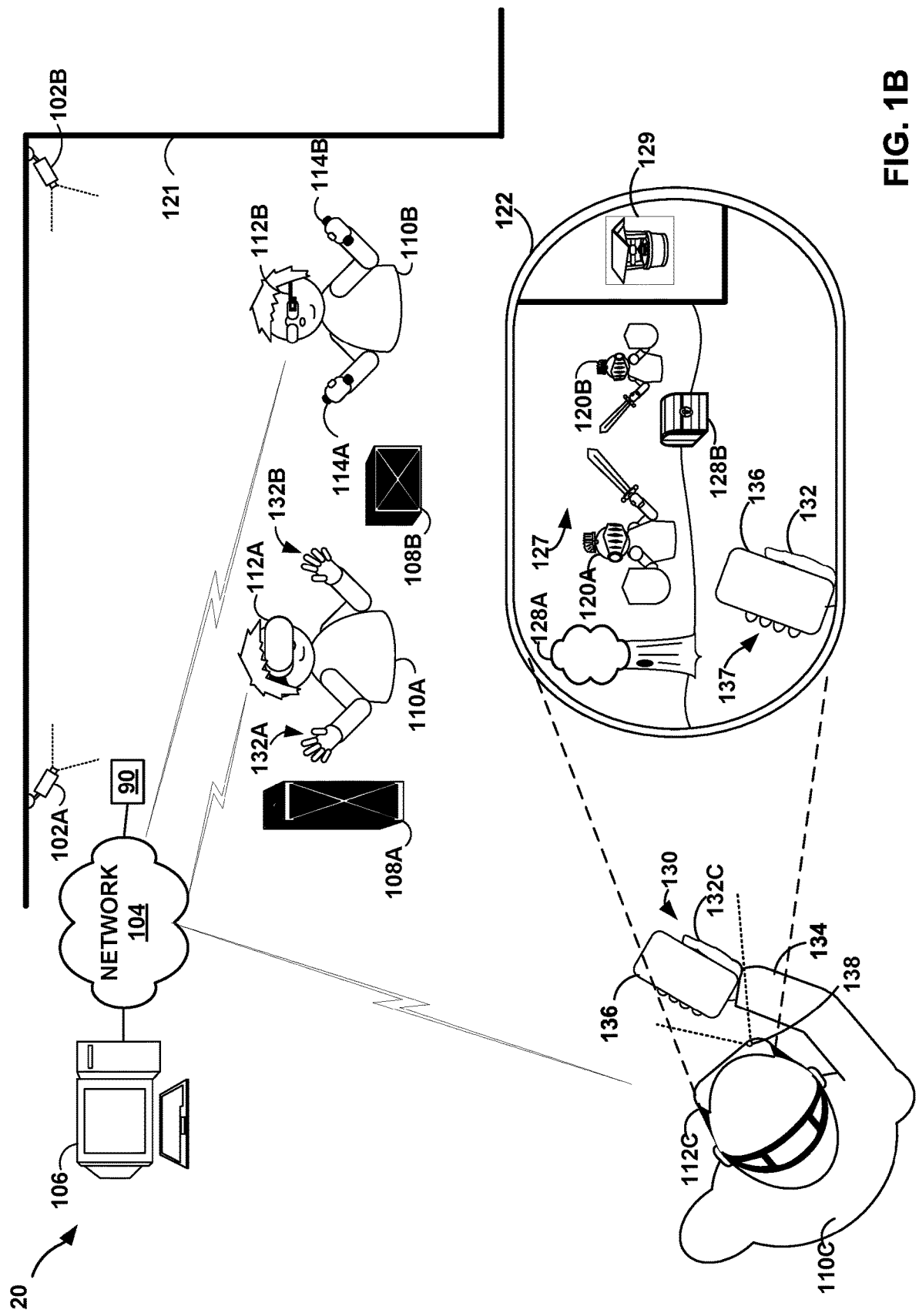
FIG. 1B is an illustration depicting an example artificial reality system that uses virtual channels to provide wireless communications between pairs of processors executing in multiple devices in a multi-user artificial reality environment, in accordance with techniques described in this disclosure.

FIG. 1B is an illustration depicting another example artificial reality system 20 that uses virtual channels to provide wireless communications between pairs of processors executing in multiple devices in a multi-user artificial reality environment, in accordance with techniques described in this disclosure. Similar to artificial reality system 10 of FIG. 1A, in some examples, artificial reality system 20 of FIG. 1B may generate and render virtual content items with respect to a virtual surface within a multi-user artificial reality environment. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real-world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction to execute one or more artificial reality applications. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications. When SoC integrated circuits within a pair of devices communicate wirelessly, another integrated circuit may establish a virtual channel from a physical communication link to so as to multiplex multiple communication channels on the physical communication link. For example, a source processor of peripheral device 136 may send to a destination processor of the HMD 112 application data in the form of video frames for rendering and presentation. Components of peripheral device 136 and the HMD 112 establish a virtual channel for transmitting the application data.

Thus, when peripheral device 136 and HMD 112C, e.g., engage in wireless communications, components within peripheral device 136 and HMD 112C may provide virtual channels to provide wireless communications between pairs of processors executing in peripheral device 136 and HMD 112C. Each processor within each of peripheral device 136 and HMD 112 may require that each other of the processors be identified by a supervisory processor.

Figure 2A:
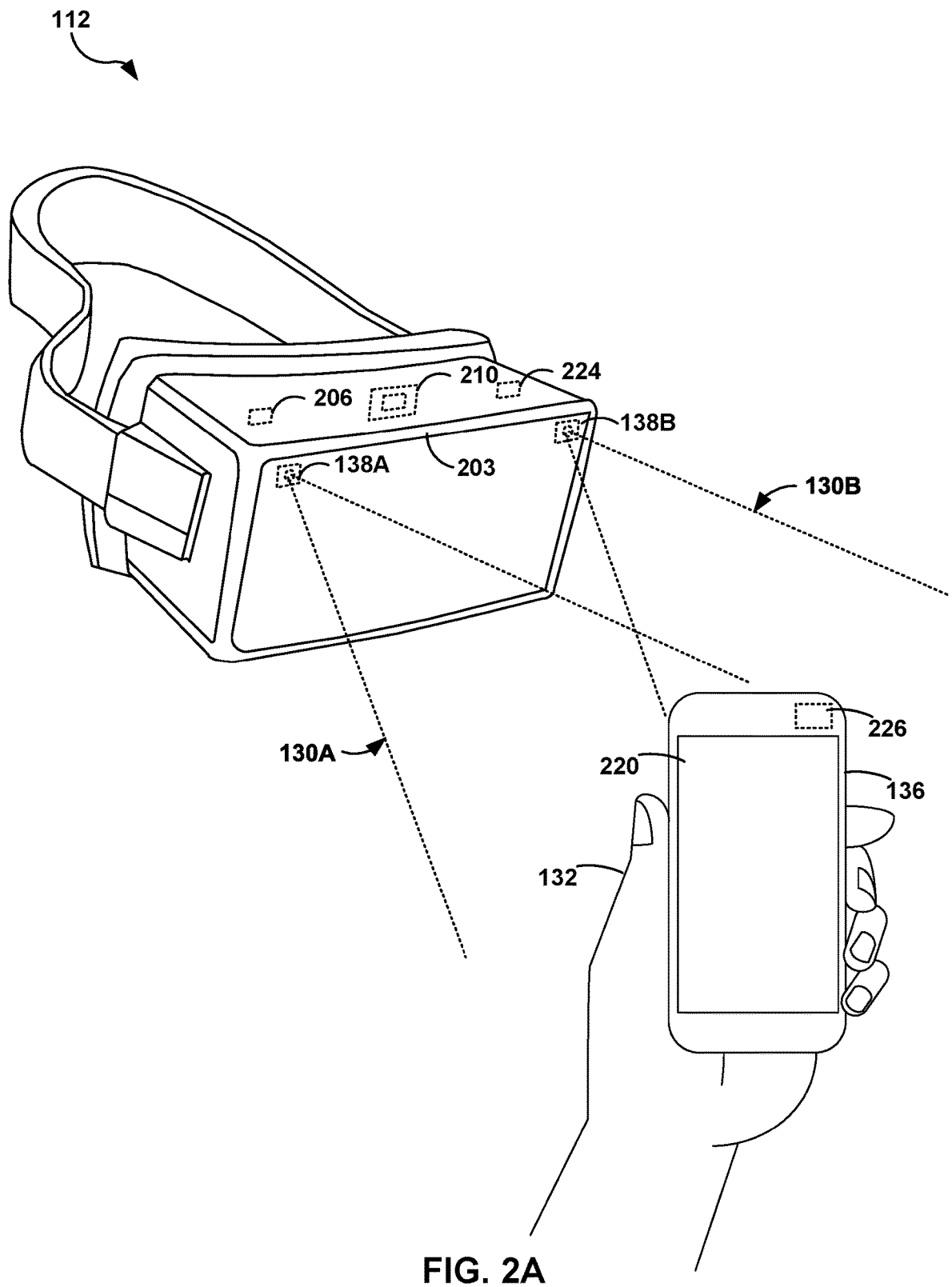
FIG. 2A is an illustration depicting an example HMD and an example peripheral device, in accordance with techniques described in this disclosure.

FIG. 2A is an illustration depicting an example HMD 112 and an example peripheral device 136 that together provide virtual channels for wireless communications, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. A wireless communication link may, for instance, involve the use of radio waves within a frequency band or channel to communicate data. This frequency band may be referred to as a physical wireless channel or physical communication link for the wireless communication link. In some examples, peripheral device can include one or more input devices (e.g., buttons, trackball, scroll wheel) for interacting with virtual content (e.g., to select a virtual UI element, scroll through virtual UI elements).

In some examples, each of the devices of the AR system 10 may include a supervisory processor (e.g., supervisory processor 224 and supervisory processor 226) in addition to the various processors that generate and/or consume application data. HMD 112 includes supervisory processor 224 to manage components of HMD 112, such as processors of SoCs of HMD 112. Peripheral device 136 includes supervisory processor 226 to manage components of peripheral device 136, such as processors of SoCs of peripheral device 136. Supervisory processor 224 and supervisory processor 226 may establish virtual channels for processors of HMD 112 to exchange data with processors of peripheral device 136. Supervisory processor 224 may utilize an encryption/decryption processor to establish a secure virtual channel between HMD 112 and peripheral device 136.

One operation of supervisory processor 224 and/or supervisory processor 226 is to manage wireless communications with another device of the AR system, for instance, by establishing a virtual channel to enable point-to-point wireless communications between devices within the AR system. It is appreciated that virtual channels can be implemented using different sets of features where each set of features includes an encryption policy, a security key-pair, a quality of service, etc. In one example, a source processor of one device requests a virtual channel from the supervisory processor, which (in turn) exchanges a stream identifier for the virtual channel with a supervisory processor of a destination processor of the other device. To manage wireless communications of the application data between the source processor and the destination processor, one or both supervisory processors may allocate a portion of shared memory within their respective device.

As described herein, any application data communicated between devices is partitioned, arranged into a particular structure and then transmitted as a sequence of fragments. Each fragment's structure complies with a virtual channel communication protocol in operation at a processor-level/subsystem-level within the AR system. The particular structure of each fragment includes a header and a payload such that the header indicates various attributes for completing the wireless communication of that fragment to a destination processor. As an example, each fragment includes metadata identifying the virtual channel by way of a corresponding channel identifier. Based upon the channel identifier, a destination device may identify the destination processor and then, communicate the fragment to the destination processor. Fragmentation as described herein, therefore, enables point-to-point wireless communications within the AR system.

In some examples, the supervisory processor 224 and/or the supervisory processor 226 operates with a logic unit to ensure that application data is being directed to a requested destination processor via an appropriate virtual channel. The logic unit, which may be referred to as a wireless handler, includes programmable logic operative on processing circuitry and configured to perform various tasks. As one example, the logic unit is configured to obtain from the supervisory processor a channel identifier for an available virtual channel connecting a source processor to the requested destination processor. The logic unit proceeds to use that channel identifier to insert into a header portion of a fragment and then prepare the fragment for transmission to the destination device. On the other device, a corresponding logic unit receives the fragment, extracts the channel identifier, and stores the fragment in a portion of shared memory allocated for the corresponding virtual channel. In one example, the corresponding logic unit stores into the portion of shared memory a sequence of fragments of which each fragment is stored in a slot corresponding to that fragment's position in the sequence. For a particular fragment, a corresponding slot's position from a beginning of the portion of shared memory may correspond to an appropriate offset (e.g., in a number of bytes or by sequence number) of that fragment from a beginning of an application payload. Hence, as another advantage, fragments may arrive at the destination device out of order. In one example, using a fragment sequence number as the appropriate offset, the wireless handler may arrange in the allocated portion of memory the fragments in proper order. Because the destination processor may thereafter read the fragment directly from the location in the buffer, this technique may avoid further data copying at the application layer.

As yet another advantage, neither the above-mentioned logic unit or any processors communicating application data in accordance with the virtual channel communication protocol do not need to comply or understand any intermediate protocol. This is (in part) because a typical communication protocol operates on physical network hardware and is limited to identifying a destination device; such a communication protocol does not identify a specific destination processor in the destination device. The virtual channel communication protocol, in contrast, operates at a processor-level granularity. In one example, when a source processor requests to transport a payload of application data, the wireless handler transforms the application payload into a plurality of fragments and generates header information for coupling with each fragment. Example header information may provide a channel identifier for a virtual channel, a fragment size, a fragment sequence number, and/or the like. The header information may further provide a source processor identifier and a destination processor identifier, but such information may be redundant to the channel identifier. The wireless handler provides the plurality of fragments to a network interface to the physical network hardware, which (in turn) transforms the plurality of fragments into packets (which are larger units) and then, transmits the packets. Once the application payload is fully formed by receiving all of the fragments, a corresponding wireless handler at the destination device delivers the application payload to the destination processor using inter-processor communication.

Figure 2B:
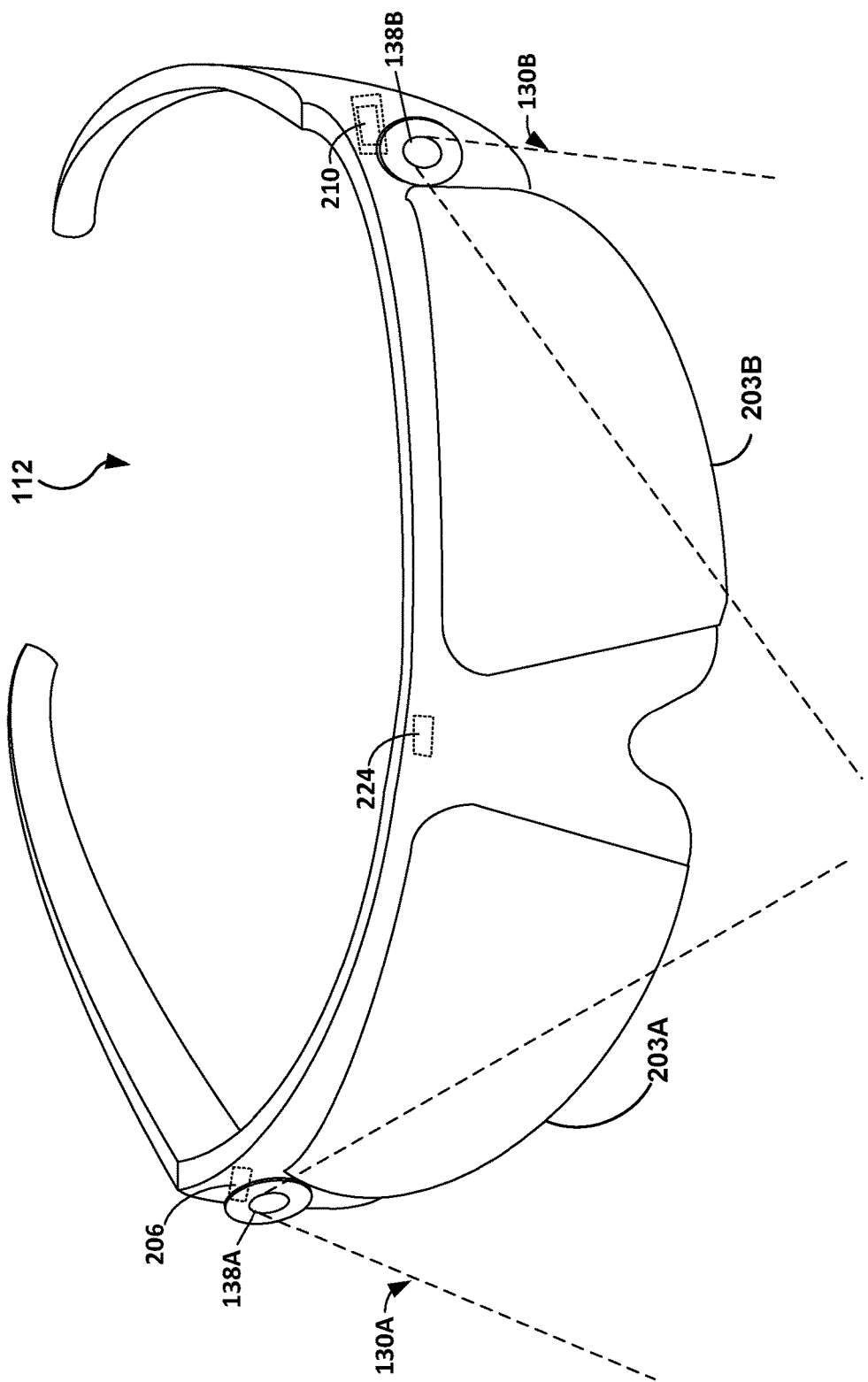
FIG. 2B is an illustration depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, HMD 112 includes a supervisory processor 224 to manage components of HMD 112, such as processors of SoCs of HMD 112. Peripheral device 136 includes a supervisory processor 226 to manage components of peripheral device 136, such as processors of SoCs of peripheral device 136. Supervisory processor 224 and supervisory processor 226 may establish virtual channels for processors of HMD 112 to exchange data with processors of peripheral device 136. Supervisory processor 224 may utilize an encryption/decryption processor to establish a secure virtual channel between HMD 112 and peripheral device 136.

Figure 3:
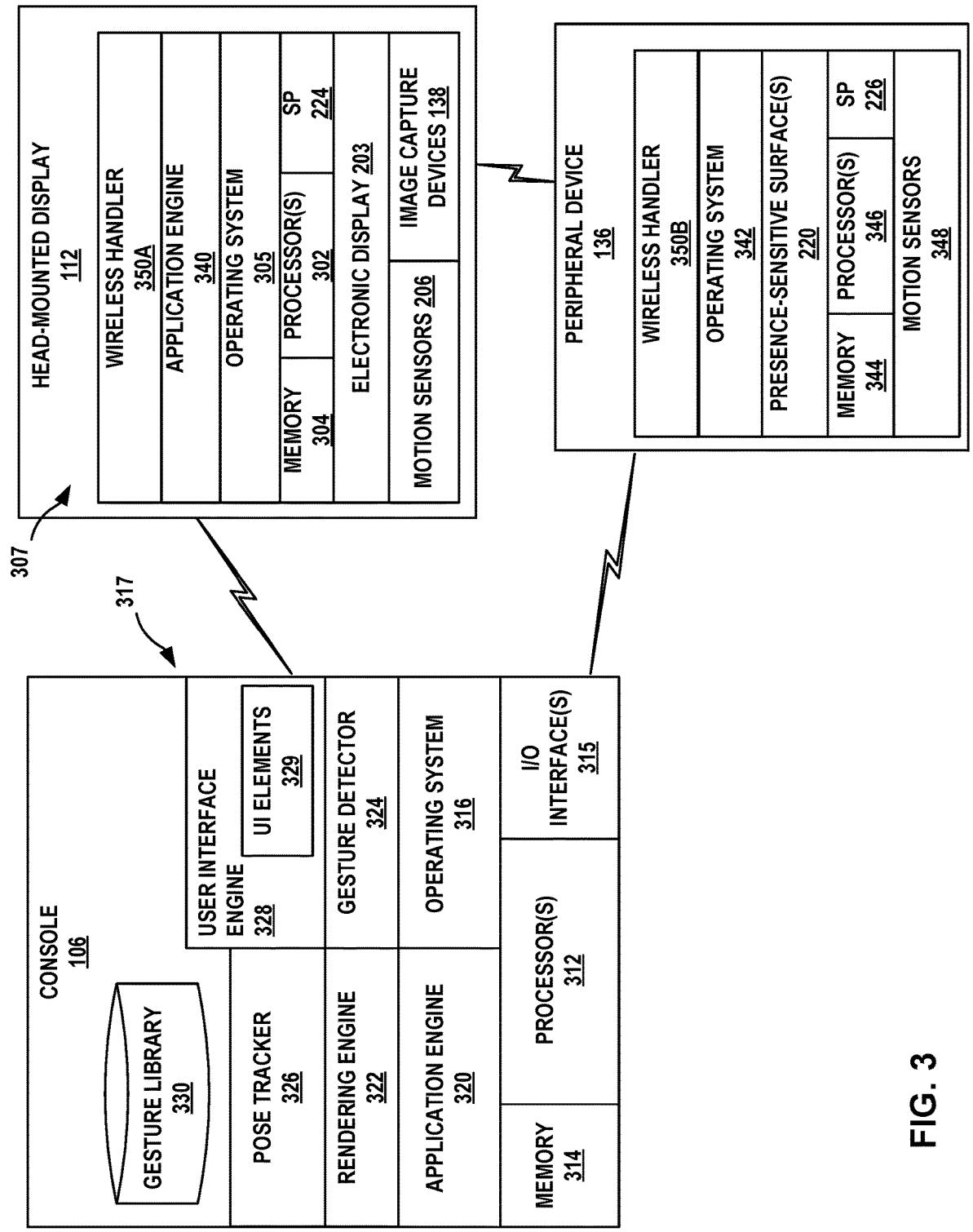
FIG. 3 is a block diagram showing example implementations of a console, an HMD, and a peripheral device of the multi-device artificial reality systems of FIGS. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit. As discussed with respect to the example of FIGS. 2A and 2B, a supervisory processor 224 provides virtual channels for HMD 112 when communicating with devices, e.g., peripheral device 136.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with the techniques described herein, the multi-device artificial reality system of FIG. 3 enables wireless communications between multiple devices when paired with each other. As discussed with respect to the examples of FIGS. 2A and 2B, peripheral device 136 may include supervisory processor 226 to manage components of peripheral device 136, such as processors of SoCs of peripheral device 136. For example, supervisory processor 226 may be configured to provide virtual channels for peripheral device 136 when communicating wirelessly with other devices of the AR system, e.g., HMD 112 and/or console 106, used in conjunction to execute one or more artificial reality applications. Similarly, HMD 112 may include a supervisory processor 224 to manage components of HMD 112, such as processors of SoCs of HMD 112. For example, supervisory processor 224 may be configured to provide virtual channels for HMD 112 when communicating wirelessly with other devices of the AR system, e.g., peripheral device 136 and/or console 106. Console 106 may also include a supervisory processor implementing the techniques described herein to provide wireless communications for HMD 112, peripheral device 136 and other devices of the AR system.

In some examples, each of the virtual channels provided by the supervisory processor 224 or the supervisory processor 226 is associated with a different pair of processors comprising a source processor selected from processors 302 of HMD 112 or processors 346 of peripheral device 136 and a destination processor selected from processors 302 of HMD 112 or processors 346 of peripheral device 136.

In at least one example, supervisory processor 224 utilizes a component known as wireless handler 350A to establish virtual channels for wireless communications between pairs of processors 302 and processors 346 or pairs of processors 302 and processors 312. Similarly, supervisory processor 226 of peripheral device 136 utilizes a component known as wireless handler 350B to virtual channels for wireless communications between pairs of processors 346 and processors 302 or pairs of processors 346 and processors 312.

Both wireless handler 350A and wireless handler 350B implement a virtual channel communication protocol permitting the exchange of application data between the above-mentioned pairs of processors. As described herein, the virtual channel communication protocol allows networking components of HMD 112 and peripheral device 136 (including wireless handler 350A and wireless handler 350B) to work around other networking protocols when communicating packets from a source processor and a destination processor. These networking protocols may be intermediate networking protocols between an application layer and a physical layer. In this manner, neither HMD 112 nor peripheral device 136 may have to resolve information for these intermediate networking protocols in order to properly communicate data between the source processor and the destination processor.

Figure 4:
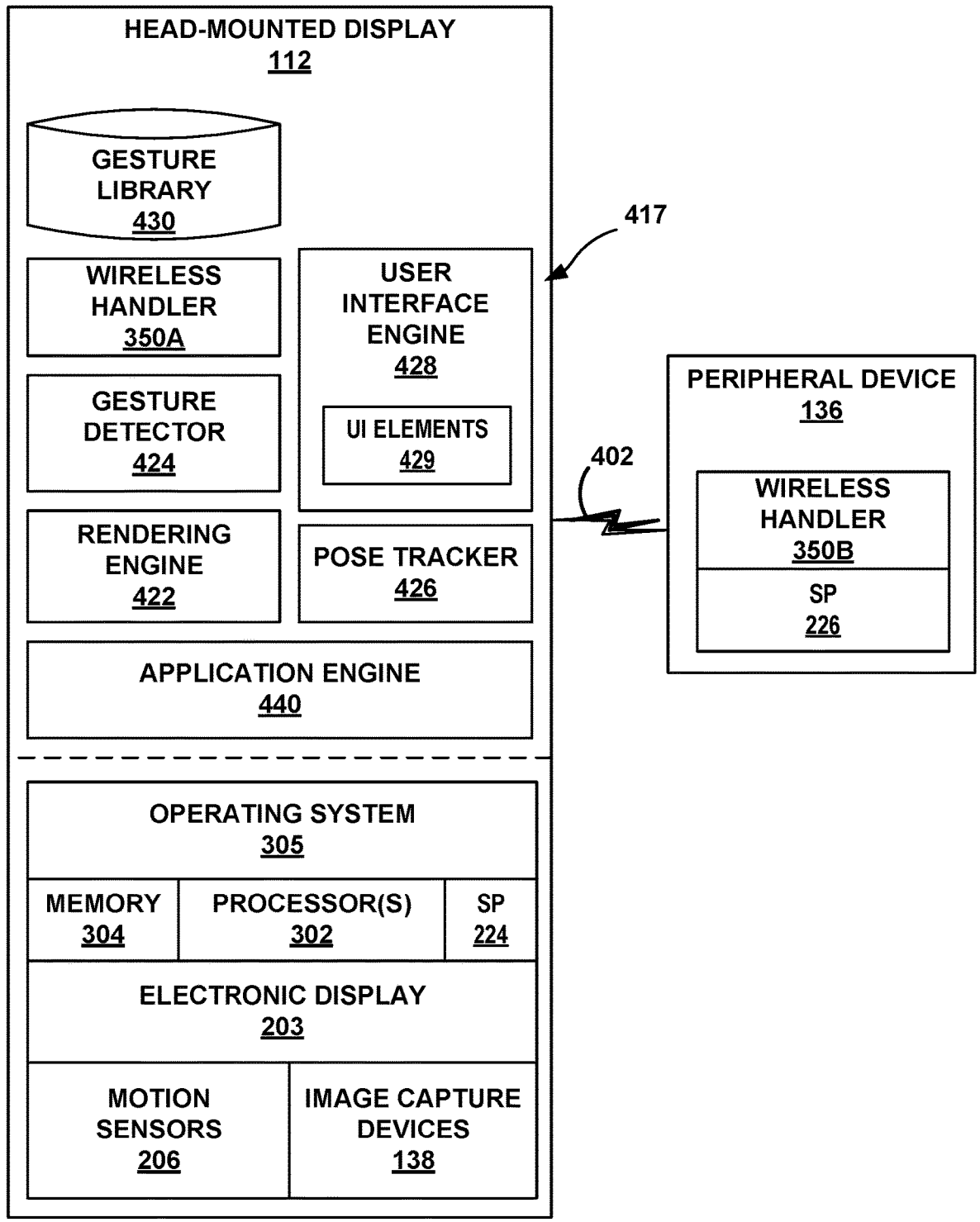
FIG. 4 is a block diagram depicting example implementations of an HMD and a peripheral device of the multi-device artificial reality systems of FIGS. 1A, 1B, in accordance with techniques described in this disclosure.

FIG. 4 is a block diagram depicting an example in which gesture detection and virtual surface generation is performed by HMD 112 of the artificial reality systems of FIGS. 1A, 1B in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software components 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. A virtual surface application generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

As discussed with respect to the examples of FIGS. 2A, 2B and 3, HMD 112 may include supervisory processor 224 to manage components of HMD 112, such as processors 302 of HMD 112. For example, supervisory processor 224 may be configured to provide virtual channels for HMD 112 when communicating wirelessly with peripheral device 136. Similarly, peripheral device 136 may include supervisory processor 226 to manage components of peripheral device 136. For example, supervisory processor 224 may be configured to provide virtual channels for peripheral device 136 when communicating wirelessly with HMD 112.

Supervisory processor 224 may store, in memory 304, various information for maintaining virtual channels, such as channel identifiers mapping source processors and destination processors engaged in wireless communications. Processors 302 may further include processing circuitry for executing logic in wireless handler 350A configured to establish virtual channels for wireless communications over physical communication link 402. To illustrate, a (source) processor of processors 302 may request an example virtual channel with a (destination) processor in peripheral device 136; and wireless handler 350A, in turn, may store information establishing the virtual channel, including identifiers for both the processor of processors 302 and processor in peripheral device 136. When the peripheral device 136 receives packets with these identifiers, wireless handler 350B running in peripheral device 136 completes the establishment of the example virtual channel communicably coupling the processor of processors 302 with the processor in peripheral device 136, for example, by recording the above-mentioned identifiers and any other information associated with the example virtual channel. Wireless handler 350B stores the packets in a portion of memory allocated to the example virtual channel. Similarly, when HMD 112 receives packets on the same example virtual channel, wireless handler 350A stores the received packets in a portion of memory allocated to the example virtual channel.

Figure 5A:
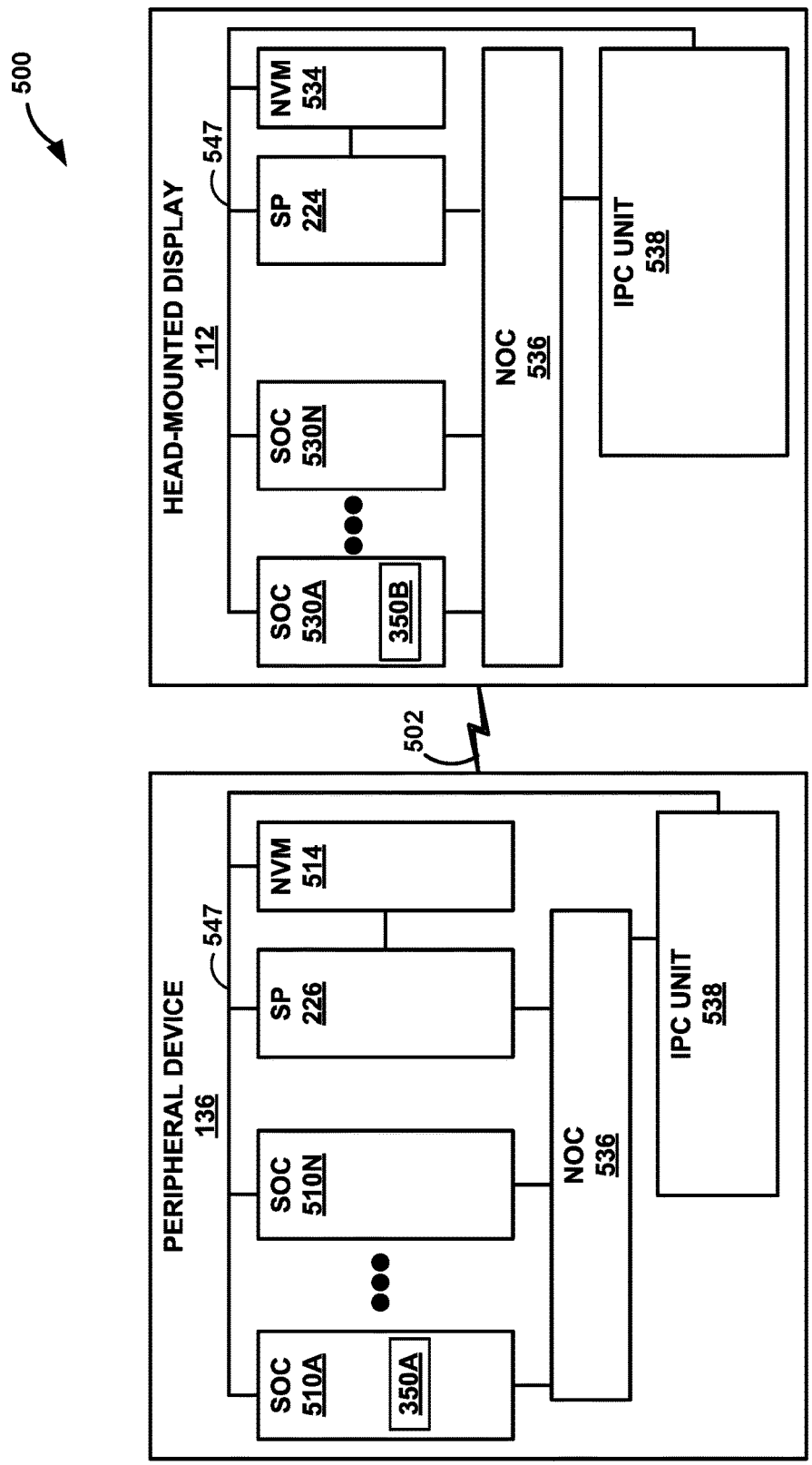
FIG. 5A is a block diagram showing an example implementation of distributed architecture for a multi-device artificial reality system, in accordance with the techniques described in this disclosure.

FIG. 5A is a block diagram showing an example implementation of a distributed architecture for a multi-device artificial reality system 500. In this example, one or more devices (e.g., HMD 112 and peripheral device 136) are implemented using one or more System-on-a-Chip (SoC) integrated circuits, in accordance with the techniques described in this disclosure. HMD 112 may be an example of any of HMDs 112 of FIGS. 1A-4. HMD 112 may be part of an artificial reality system, such as artificial reality systems 10, 20 of FIGS. 1A, 1B, or may operate as a stand-alone, mobile artificial reality system configured to implement the techniques described herein.

Figure 5B:
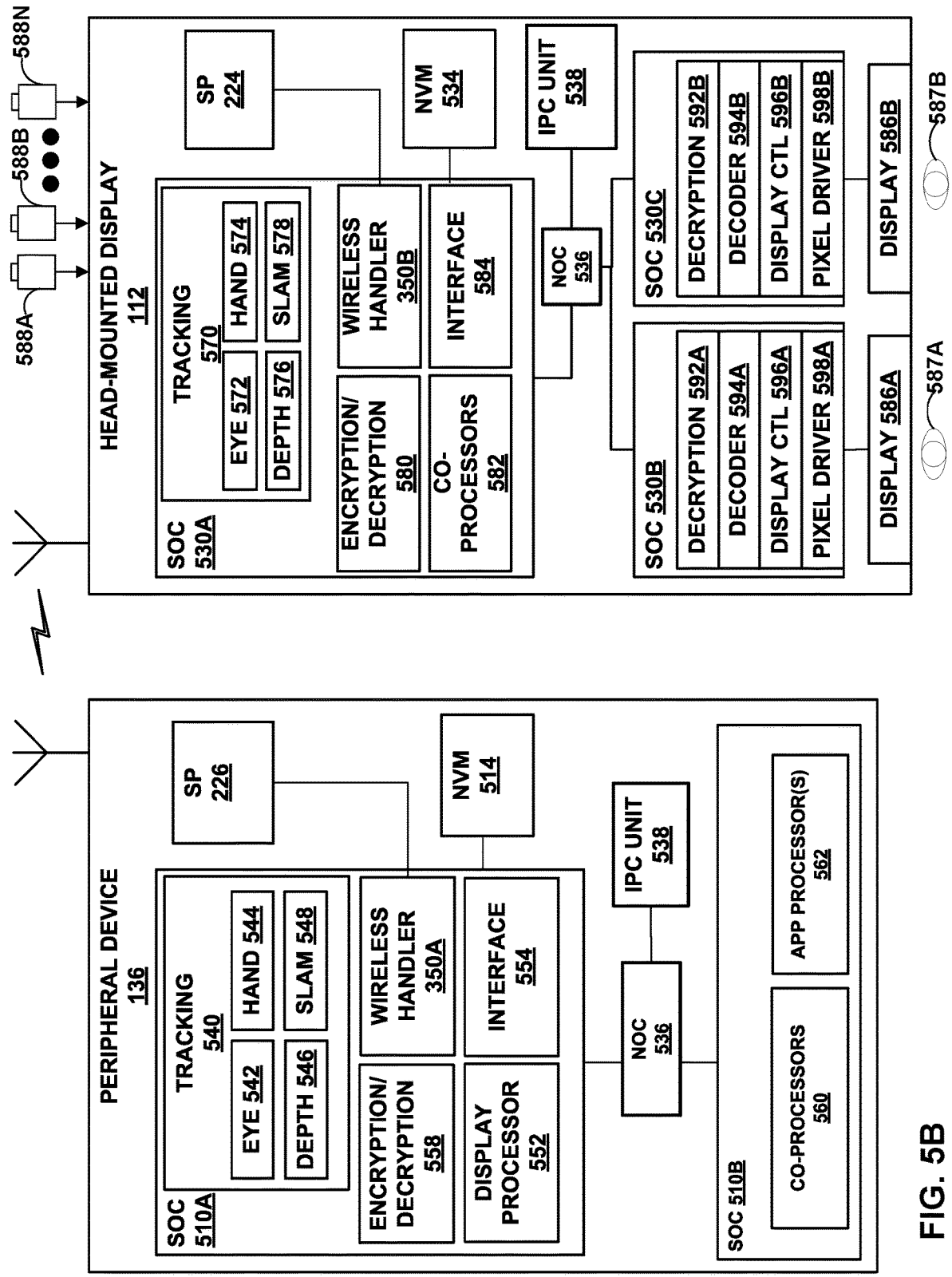
FIG. 5B is a block diagram illustrating a more detailed example implementation of a distributed architecture for a multi-device artificial reality system in which one or more devices (e.g., peripheral device and HMD) are implemented using one or more SoC integrated circuits within each device, in accordance with the techniques described in this disclosure.

In this example, HMD 112 includes supervisory processor 224, SoCs 530A-530M (collectively, "HMD SoCs 530"), non-volatile memory 534, network-on-chip (NoC) 536, and inter-processor communication (IPC) unit 538. IPC unit 538 includes mutex register, processing circuitry, and/or doorbell registers. In general, SoCs 530 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. A more detailed example is shown in FIG. 5B. Similarly, peripheral device 136 includes a NoC 536 and IPC unit 538.

In the example of FIG. 5A, supervisory processor 224 of HMD 112 provides virtual channels for HMD when communicating wirelessly with other devices, e.g., peripheral device 136, that are used to execute one or more artificial reality applications. As discussed with respect to the example of FIGS. 2A and 2B, when source processor(s) of a subsystem in HMD 112 are to communicate wirelessly with destination processor(s) of a subsystem in peripheral device 136, supervisory processor 224 coordinates with supervisory processor 226 to establish a virtual channel to enable such wireless communications over physical wireless communication link 502.

As described herein, supervisory processor 224 and/or supervisory processor 226 may establish a virtual channel by allocating storage space in shared memory for storing wireless communications between a source processor and a destination processor over communication link 502. Supervisory processor 224 and/or supervisory processor 226 may further define various attributes for the example virtual channel, such as storage space size (e.g., in a number of bytes), storage space location (e.g., in byte offsets), a channel identifier, a security key for encryption, etc. Other attributes for the example virtual channel may include identifiers for the source processor and the destination processor.

Peripheral device 136 includes SoCs 510A-510N (collectively, "peripheral device SoCs 510"), supervisory processor 226, and non-volatile memory 514. SoCs 510 may each be configured to support an artificial reality application, such as SoCs operating as co-application processors, sensor aggregators, display controllers, etc. Supervisory processor 226, similar to supervisory processor 224, establishes virtual channels for enabling low-latency wireless communications between a source processor of a subsystem in peripheral device 136 and destination processor(s) of a subsystem in HMD 112.

FIG. 5B is a block diagram illustrating a more detailed example implementation of a distributed architecture for a multi-device artificial reality system in which one or more devices (e.g., peripheral device 136 and HMD 112) are implemented using one or more SoC integrated circuits within each device. As described, peripheral device 136 and HMD 112 are architected to enable secure wireless communication between pairs of processors over a wireless communication link, in accordance with techniques described in this disclosure.

In general, the SoCs illustrated in FIG. 5B represent a collection of specialized integrated circuits arranged in a distributed architecture, where each SoC integrated circuit includes various specialized functional blocks configured to provide an operating environment for artificial reality applications. FIG. 5B is merely one example arrangement of SoC integrated circuits. The distributed architecture for a multi-device artificial reality system may include any collection and/or arrangement of SoC integrated circuits.

Illustrated components of each of the SoC 510 and 530, such as tracking module 540, display processor 552, co-processors 582, and so forth, may represent different subsystems within the corresponding SoCs that communicate with one another within an SoC via the NoC and with sub-systems on other SoCs via virtual channels established according to techniques described herein. Each such sub-system may include a processor configured to execute instructions for the sub-system. If a processor of a first sub-system of SoC 510A is to send data to a processor in a second sub-system SoC 530A, e.g., supervisory processors 224 and 226 cooperatively establish a virtual channel for point-to-point wireless communications between the first, source sub-system and the second, destination sub-system.

In some examples, both peripheral device 136 and HMD 112 include a SoC manager in the form of supervisory processor 226 and supervisory processor 224, respectively. In this example, SoC 530A of HMD 112 comprises functional blocks including wireless handler 350B, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Display processor 552 includes one or more processors such as a video processing unit, graphics processing unit, encoders and/or decoders, and/or others, for rendering artificial reality content to HMD 112.

Interface 554 includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

SoC 510B includes co-application processors 560 and application processors 562. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 136 and/or to detect gestures performed by a user with respect to peripheral device 136.

Encryption/decryption 558 encrypts outgoing data communicated to HMD 112 and decrypts incoming data communicated from HMD 112. At least some of the outgoing data and the incoming data may be communicated wirelessly on virtual channels that are established by wireless handler 350A and supervisory processor 226. Encryption/decryption 558 may support symmetric key cryptography to encrypt/decrypt data using a session key (e.g., secret symmetric key). For example, in response to receiving in a wireless channel data from SoCs 530 of HMD 112 encrypted with a first session key ($S_{k1}$), encryption/decryption 558 decrypts the data using the first session key ($S_{k1}$). Encryption/decryption 558 encrypts data communicated between a processor of SoCs 510 and a processor of SoCs 530 with a second session key ($S_{k2}$) to securely communicate with HMD 112 on a virtual channel. In response to receiving data encrypted with the second session key ($S_{k2}$), encryption/decryption 558 decrypts the encrypted data using the second session key ($S_{k2}$). In some examples, HMD 112 may digitally sign the encrypted data by encrypting a hash of the data with a private key. In these examples, encryption/decryption 558 verifies the signature using a server public key and verify the authenticity and integrity of the data (e.g., by running the data through the same hashing algorithm as HMD 112).

Encryption/decryption 580 is a functional block to encrypt outgoing data communicated to peripheral device 136 and decrypt incoming data communicated from peripheral device 136. At least some of the outgoing data and the incoming data may be communicated wirelessly on virtual channels that are established by wireless handler 350B and supervisory processor 224. Encryption/decryption 580 may support symmetric key cryptography to encrypt/decrypt data with a session key (e.g., secret symmetric key). For example, when sending data via a virtual channel to SoCs 530A-530C of peripheral device 136 from HMD 112, encryption/decryption 580 encrypts the data of with a first session key ($S_{k1}$) for securely communicating (wirelessly) to peripheral device 136. Encryption/decryption 580 also encrypts the data with a public key to securely communicate the data to peripheral device 136 via a wireless channel. In response to receiving data encrypted with a second session key ($S_{k2}$) from peripheral device 136, encryption/decryption 580 decrypts the encrypted data using the second session key ($S_{k2}$). In some examples, peripheral device 136 may digitally sign the encrypted data by encrypting a hash of the data with a private key. In these examples, encryption/decryption 580 verifies the signature using a server public key and verify the authenticity and integrity of the data (e.g., by running the data through the same hashing algorithm as peripheral device 136).

Co-application processors 582 includes various processors such as a video processing unit, graphics processing unit, digital signal processors, encoders and/or decoders, and/or others.

Interface 584 is a functional block that includes one or more interfaces for connecting to functional blocks of SoC 530A. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 136.

As discussed with respect to the example of FIG. 5A, supervisory processor 226 provides virtual channels to enable wireless communications for HMD 112 when communicating with devices, e.g., peripheral device 136, that are used to execute one or more artificial reality applications. Similarly, supervisory processor 224 provides virtual channels to enable wireless communications for peripheral device 136 when communicating with devices, e.g., HMD 112, that are used to execute one or more artificial reality applications. Supervisory processors 224 and 226 provide their respective wireless handlers 350A-350B with virtual channel information, including virtual channel identifiers as well as size and location attributes for each virtual channel's allocated portion in memory. For example, when peripheral device 136 receive wireless communications in the form of packets, a first processor in wireless handler 350A extracts from such packets a plurality of fragments comprising an application payload and identifies an appropriate virtual channel from a fragment header. A second processor in wireless handler 350A identifies in memory a portion allocated to the appropriate virtual channel. The second processor in wireless handler 350A stores in the allocated portion of memory the plurality of fragments arranged in sequence number order. It is appreciated that wireless handler 350B in HMD 112 operates in a similar fashion as wireless handler 350A when wireless communications in the form of packets is received.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 510A and 510B configured to support an artificial reality application. In this example, SoC 510A comprises functional blocks including wireless handler 350A, tracking 540, an encryption/decryption 558, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Figure 6:
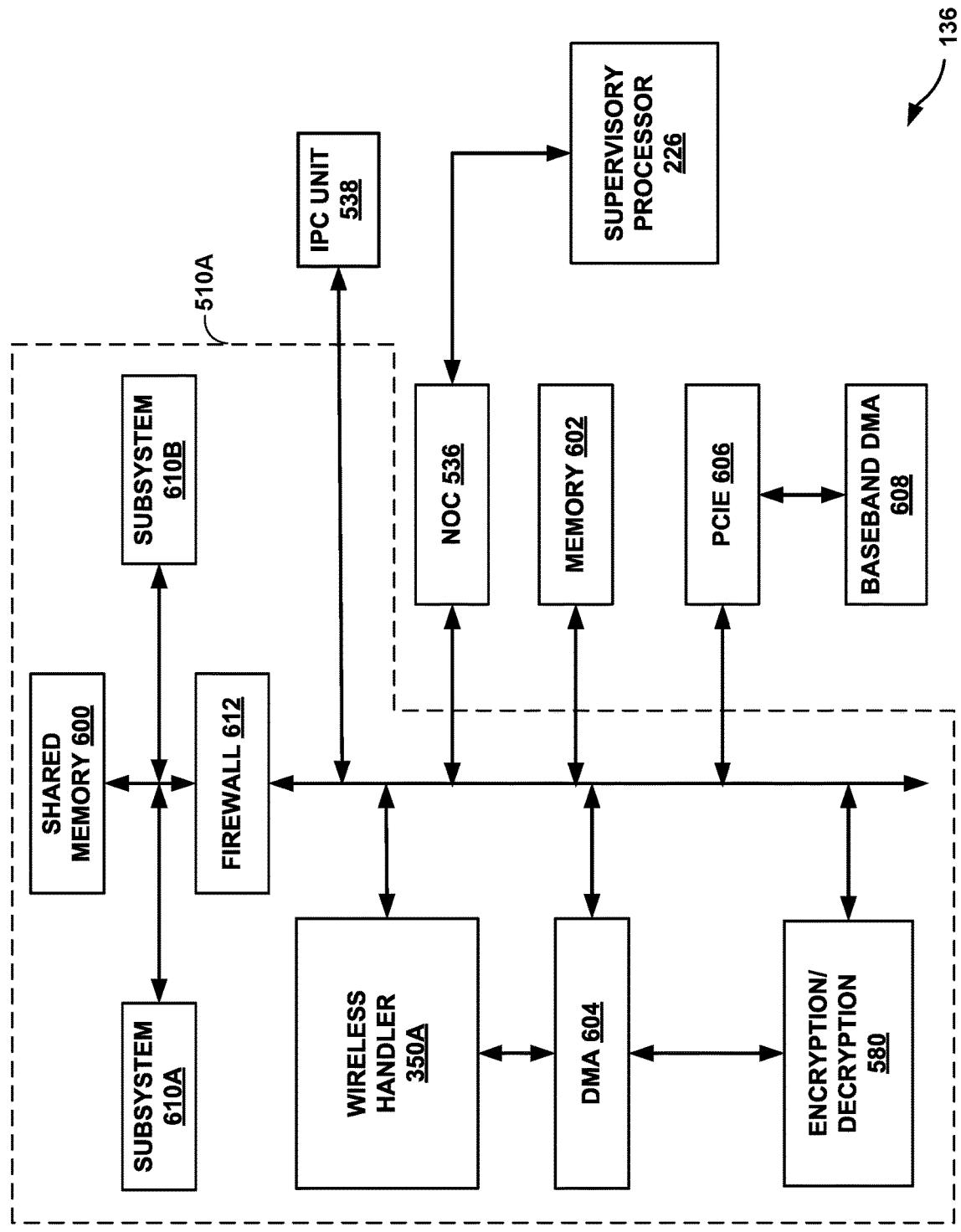
FIG. 6 is a block diagram illustrating components of an example implementation of a System-On-Chip (SoC) in a multi-device artificial reality system, in accordance with the techniques described in this disclosure.

FIG. 6 is a block diagram illustrating components of an example implementation of a System-On-Chip (SoC) in a multi-device artificial reality system, in accordance with the techniques described in this disclosure. As described herein for FIGS. 5A-5B, SoCs 510A, 530A within HMD 112 and peripheral device 136, respectively, utilize a supervisory processor to provide virtual channels for enabling low-latency wireless communications.

Although SoC 510A is being illustrated in FIG. 6, a same or similar set of components could be implemented for SoC 530A in HMD 112. In one example, wireless handler 350A includes processing circuitry comprising a first processor and a second processor while another example of wireless handler includes a wireless microcontroller unit (WMCU). SoC 510A also includes memory 602, direct memory access (DMA) unit 604, subsystems 610A-B, and firewall 612. It is appreciated that one or more processors, logic, and (possibly) other components may form an example subsystem for generating and/or consuming application data. The above-listed components of SoC 510A are coupled via a shared bus to PCIe interface 606. The overall connection fabric within SoC 510A by which the various components connect, directly or indirectly, to shared bus may incorporate network on chip (NoC) connectivity, another shared bus, hierarchical interconnect fabrics, and/or other types of connectivity. PCIe interface 606 is coupled to baseband DMA unit 608 via PCIe bus. Although the example implementation shown in FIG. 6 incorporates PCIe bus and PCIe interface 606, SoC 510A may incorporate other types of connectivity infrastructure in other examples consistent with this disclosure, such as universal serial bus (USB™) connectivity, peripheral component interconnect (PCI) connectivity, or numerous other types.

In one example, a source processor in subsystem 610A of peripheral device 136 desires wireless communications with a destination processor in a counterpart subsystem within another device of the multi-device artificial realty system. Supervisory processor 224, in response to the source processor, establishes a virtual channel for such wireless communications by allocating a portion of shared memory 600 for storing any data exchanged via the virtual channel and generating a channel identifier for specifying such data. Supervisory processor 224 may or may not communicate the virtual channel identifier to a counterpart supervisory processor on the other device.

Supervisory processor 226, in coordination with wireless handler 350A, generates header information for storing various attributes such as the virtual channel identifier. The header information will be inserted into a data structure known as a fragment in accordance with a virtual channel communication protocol in effect in the multi-device artificial realty system. The fragment's structure includes a payload portion for storing application data (i.e., an application payload).

As described herein, wireless handler 350A includes logic, operative on processing circuitry, configured to communicate a plurality of fragments to the other device in an inter-process communication. Wireless handler 350A includes logic further configured to process an inter-process communication received from the other device via the virtual channel and comprising one or more fragments of another application payload.

In one example, the wireless handler 350A determines header information in a fragment and extract a channel identifier for a virtual channel. Using the channel identifier, wireless handler 350A identifies a portion of shared memory 600 that is allocated to storing fragments for the virtual channel. Wireless handler 350A, in coordination with supervisory processor 226, stores each received fragment in an appropriate slot in the allocated portion of shared memory 600. In one example, the appropriate slot's position corresponds to a position (e.g., an offset in bytes or a sequence number) of the received fragment in the application payload. In another example, the appropriate slot may be selected at random.

Figure 7:
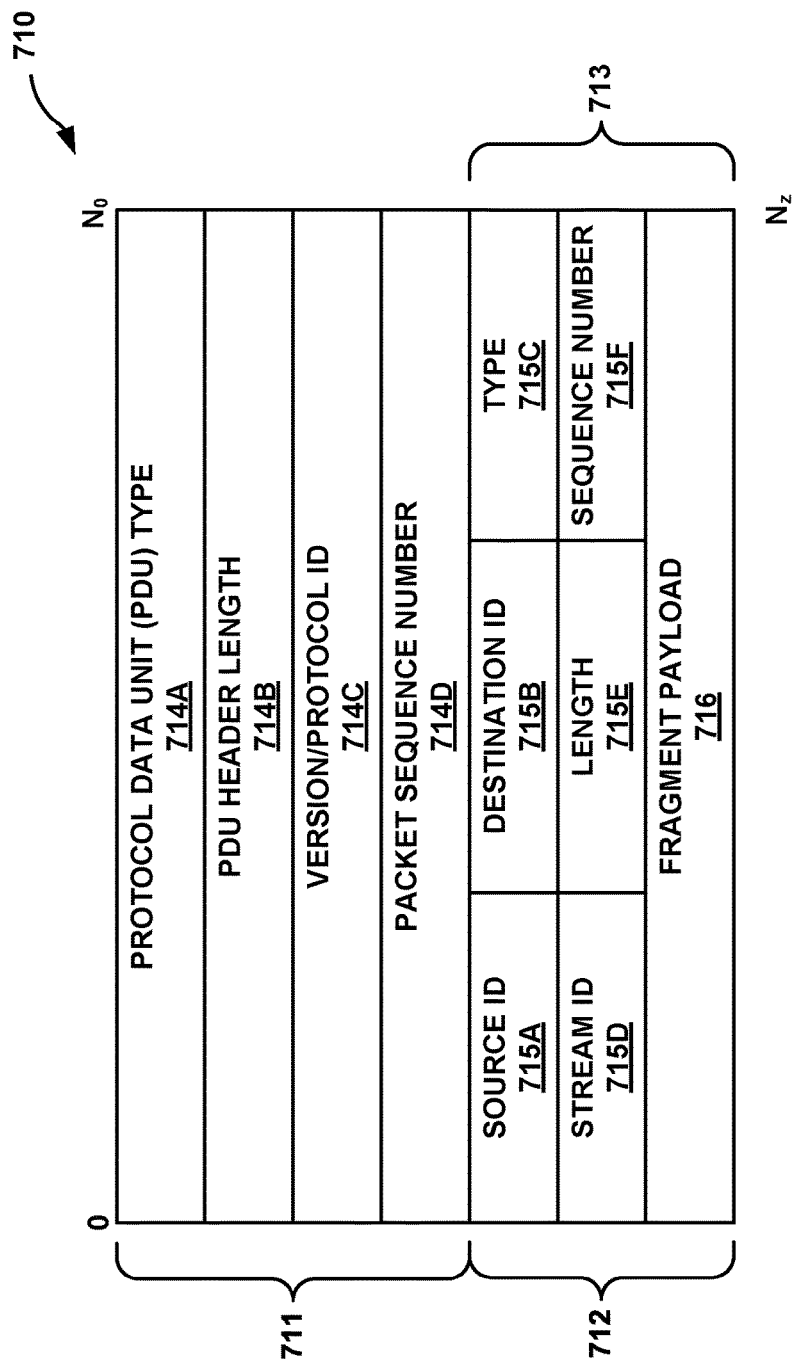
FIG. 7 is an illustration depicting example fragments of an application payload being communicated between devices in a multi-device artificial reality system, in accordance with the techniques described in this disclosure.

FIG. 7 is an illustration depicting example fragments of an application payload being communicated between devices in a multi-device artificial reality system, in accordance with the techniques described in this disclosure. As illustrated in FIG. 7, the example fragments are arranged in a packet. Header information in the example fragments introduce one or more attributes into the packet.

Example packet 710 includes a header portion 711 and a data portion 712 including fragment 713. Alternatively, the example packet 710 may include multiple fragments, space permitting.

Fragment 713 includes a fragment header 715 and a fragment payload 716. For example, fragment header 715 for fragment 713 includes, as attributes, a source identifier 715A, a destination identifier 715B, a type 715C, a stream identifier 715D, a length 715E, and a sequence number 715F.

In one example, there are two possible type attributes for the type 715C: Non-Fragmented and Fragmented. Example packet 710 illustrates a Fragmented Type where the application payload exceeds a size restriction and is to be fragmented into at least two fragments. For one pair of a source processor and a destination processor, there could be multiple streams in one system interval, as well as across system intervals. The identifier value in stream identifier 715D is maintained by the wireless handler for the computing device and increased by one for every source request.

For each stream, the wireless handler allocates a memory buffer and includes a length in the length attribute 715E. A corresponding wireless handler at the destination device uses the length attribute to allocate a buffer with an appropriate size. For each memory buffer, the sequence number attribute may be a byte offset of fragment 713 in example packet 710 from the memory buffer. The corresponding wireless handler uses the sequence number attribute 715F to program a correct address of the example packet 710. Assuming the memory buffer is allocated at address fp, the address in the memory buffer for storing the fragment is computed as fp+sequence number. The source identifier and the destination identifier attributes correspond to a pair of processors having a virtual channel between two devices of the multi-device system. As a substitute for the sequence number attribute, an absolute address may be implemented.

In some cases, by allocating buffers within memory of the destination device based on the source ID 715A, destination ID 715B, stream ID 715D tuple, the destination wireless handler may ensure isolated and secure destination buffers for the virtual channels.

Figure 8:
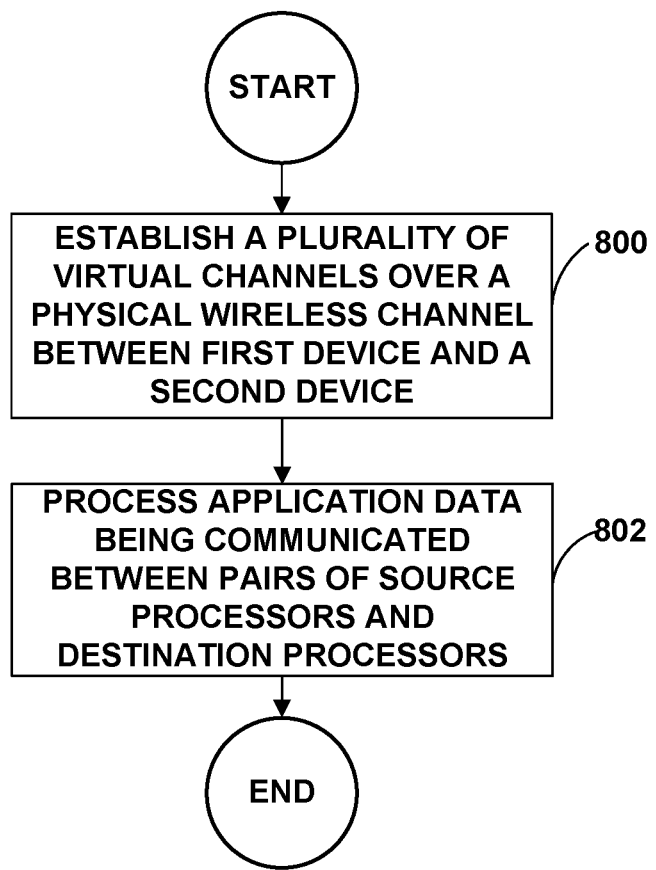
FIG. 8 is a flow diagram illustrating example operations of a supervisory processor, in accordance with one or more techniques of this disclosure.

FIG. 8 is a flow diagram illustrating example operations of a supervisory processor, in accordance with one or more techniques of this disclosure. FIG. 8 is described with respect to artificial reality system 500 of FIGS. 5A-5C and 6. However, the techniques of FIG. 8 may be performed by different components of artificial reality system 500 or by additional or alternative devices.

The supervisory processor (e.g., supervisory processor 224, 226) establishes a plurality of virtual channels over a physical wireless channel between a first device and a second device (800). Each virtual channel of the plurality of virtual channels is associated with a different pair of source processors and destination processors of the plurality of processors of the first device (e.g., peripheral device 136) and the second device (e.g., HMD 112). Each pair of processors is allocated a portion of memory to store application payloads. For an example virtual channel, a component (e.g., SoC 510B) comprising processing circuitry (e.g., application processor 562) in the first device (or the second device) may operate as an example source processor, an example destination processor, or both.

The supervisory processor processes the application data being communicated between the pairs of source processors and destination processors in the first device and the second device using respective ones of the virtual channels (802). The application data described herein refers to application payloads exchanged between the first device and the second device. An example processor (e.g., application processor 562) of an example pair of source processor and destination processor of a virtual channel may process, by the first device, a portion of the application data communicated by the second device on the virtual channel. In another example, the example processor (e.g., application processor 562) may communicate, by the first device, another portion of the application data to the second device on the virtual channel.

As described herein, both peripheral device 136 and HMD 112 of artificial reality system 500 may include one or more System on a Chip (SoC) integrated circuits configured to support an artificial reality application, such as SoCs operating as co-application processors, sensor aggregators, display controllers, etc. When individual SoCs in peripheral device 136 and HMD 112 communicate application data, the supervisory processor on peripheral device 136 and/or HMD 112 establishes a virtual channel over the physical wireless channel (e.g., a frequency channel) by which the SoCs can communicate wirelessly. The supervisory processor engages the wireless handler 350A/350B in peripheral device 136 and/or HMD 112 to facilitate the establishment of each virtual channel and the management of any application payload exchanged on the virtual channel.

In one example, a processor in an SoC of peripheral device 136 receives via a virtual channel fragments of an application payload that is generated by another processor in a SoC in HMD 112. Wireless handler 350B issues an IPC to the processor of peripheral device 136. In response, wireless handler 350A reads and processes each fragment. As described herein, each fragment's structure includes header information identifying the virtual channel and/or a destination processor in a subsystem of HMD 112. Wireless handler 350B in HMD 112 receives the fragments and, based on the header information, determines the portion of memory in that device for the virtual channel. Wireless handler 350B slots the fragments, based on their order within the application payload, to their appropriate locations within the portion of the memory.

Figure 9:
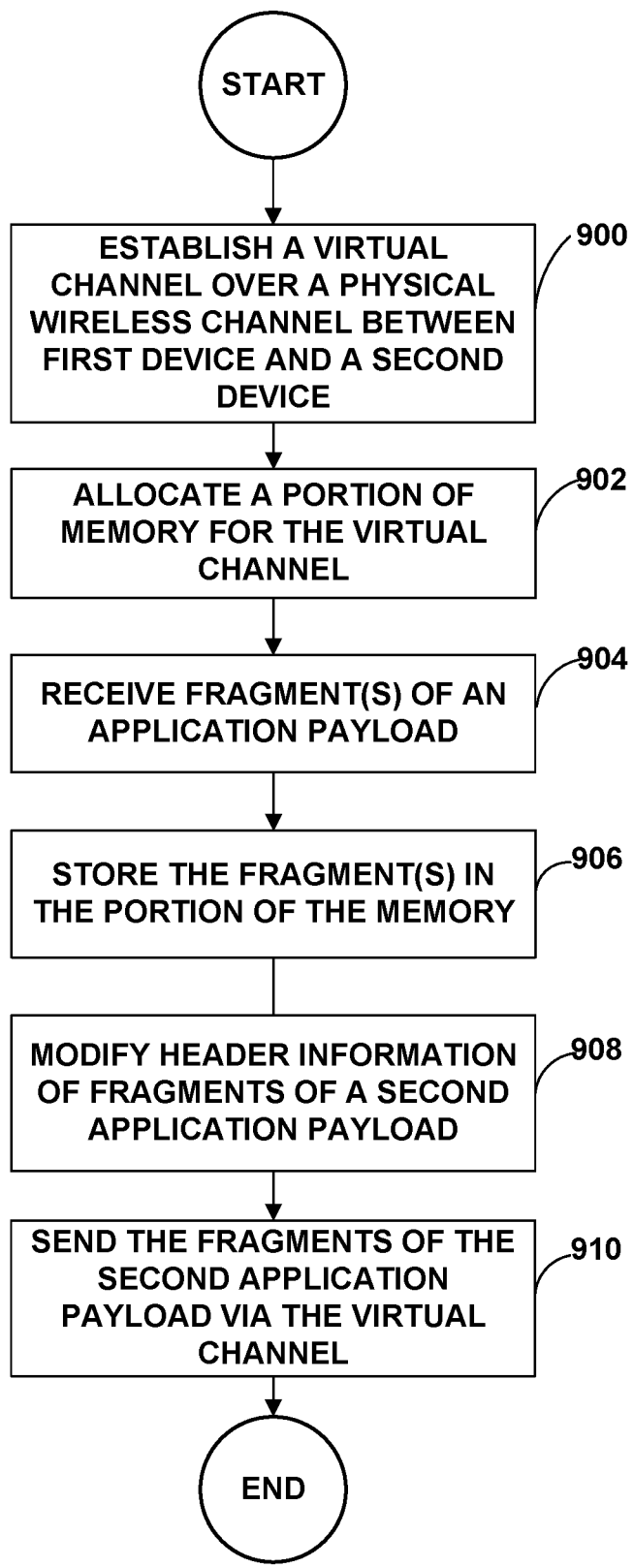
FIG. 9 is a flow diagram illustrating example operations of a wireless handler, in accordance with one or more techniques of this disclosure.

FIG. 9 is a flow diagram illustrating example operations of a wireless handler, in accordance with one or more techniques of this disclosure. FIG. 9 is described with respect to artificial reality system 500 of FIGS. 5A-5C and 6. However, the techniques of FIG. 9 may be performed by different components of artificial reality system 500 or by additional or alternative devices.

The wireless handler, on behalf of a supervisory processor (e.g., supervisory processor 224, 226), establishes the virtual channel over a physical wireless channel (e.g., a frequency channel) between a first device and a second device (900). The virtual channel is allocated and usable for wireless communications between a source processor of the first device (e.g., peripheral device 136) and a destination processor of the second device (e.g., HMD 112). A system-on-chip (SoC) (e.g., SoC 510N) in the first device may include the source processor and/or another SoC (e.g., SoC 530N) in the second device may include the destination processor.

The wireless handler, on behalf of the supervisory processor, allocates a portion of memory in the first device for storing application data communicated via the virtual channel (902). As described herein, the wireless handler (e.g., wireless handler 350A, 350B) may be a component of a SoC in the first device or the second device along with the memory (e.g., shared memory 600 of FIG. 6). The wireless handler may include processing circuitry (e.g., one or more processors) executing logic to manage one or more virtual channels. The memory may refer to shared memory in the same SoC as the wireless handler. The portion of memory will be used for storing fragments of an application payload that is generated by the destination processor. Because the wireless handler slots the portion of memory to fit the application payload, each fragment corresponds to a slot in the portion of the memory and is assigned a sequence number corresponding to that fragment's position in the application payload.

The wireless handler receives, at the first device, one or more fragments of the application payload (904) and stores the one or more fragments in the portion of the memory (906). The wireless handler determines a memory location for each fragment based upon the assigned sequence number. In some examples, the memory location is an offset (e.g., in bytes) from a base address for a start of the allocated portion of the memory.

The wireless handler modifies header information of fragments of a second application payload (908) and sends, to the second device, the one or more fragments of the second application payload via the virtual channel (910). In some examples, the wireless handler allocates a second portion of the memory in order to store the second application payload and determines byte offsets for the fragments from a start of the second application payload. The wireless handler translates the byte offsets into sequences numbers and stores, in each fragment, an appropriate sequence number corresponding to that fragment's byte offset in the second application payload.

Figure 10:
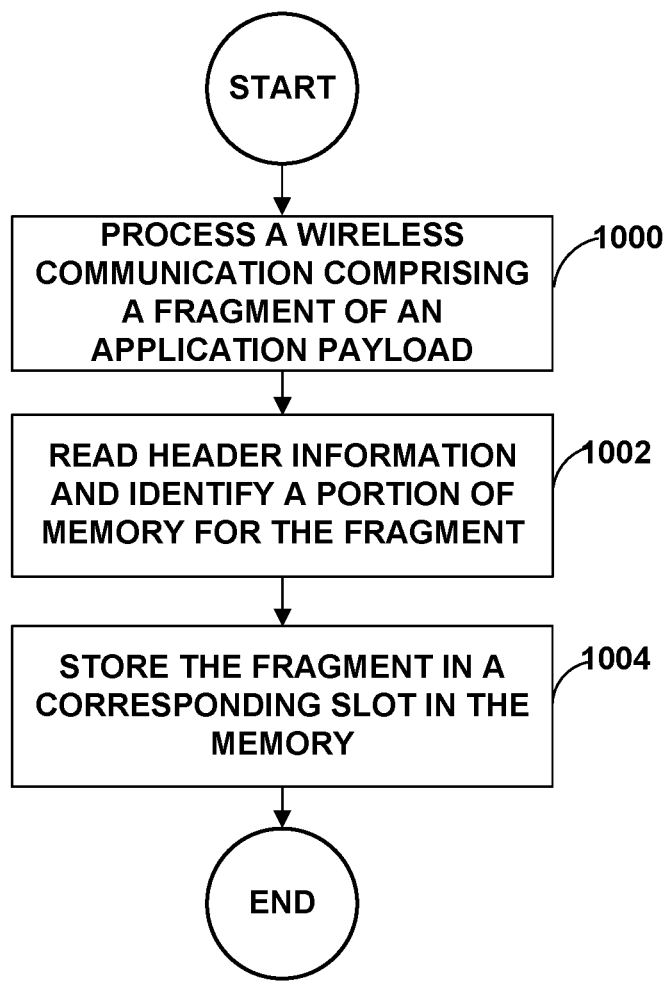
FIG. 10 is a second flow diagram illustrating example operations of a wireless handler, in accordance with one or more techniques of this disclosure.

FIG. 10 is a second flow diagram illustrating example operations of a wireless handler, in accordance with one or more techniques of this disclosure. FIG. 8 is described with respect to artificial reality system 500 of FIGS. 5A-5C and 6. However, the techniques of FIG. 8 may be performed by different components of artificial reality system 500 or by additional or alternative devices.

The wireless handler processes a wireless communication comprising a fragment of an application payload (1000). The wireless communication may be in the form of a data unit, such as a network packet, transmitted via a physical wireless link between a first device and a second device of artificial reality system 500. The data unit may partitioned into a header portion and a data portion in which the fragment is encapsulated. The header portion is arranged to store attributes describing the fragment of the application payload. The attributes in the header portion, which may also be known as header information, include (but not limited to) a source identifier, a destination identifier, a stream identifier, a (fragment) sequence number, etc.

The wireless handler reads the header information and identifies a portion of memory for the fragment (1002). Among the attributes in the header information, at least one may be used to identify an appropriate memory region to store the fragment. In some examples, the wireless handler may perform a lookup operation on a mapping table and translate the source identifier, destination identifier, and/or the stream identifier into a memory address. It is appreciated that there a number of ways to express the memory address, including an absolute address pointing to a specific memory location or a relative address from a base memory location. In any case, the above-mentioned memory address maps to the portion of the memory allocated for storing the application payload. The memory address may further map to a corresponding slot (e.g., byte address) for storing the fragment of the application payload. In other examples, the memory address may map to a first slot (i.e., a (0) zero byte address) of the portion of the memory, and by adding the sequence number attribute in bytes, the wireless handler determines the corresponding slot for storing the fragment. The memory address may be a byte-address indicating a number of bytes incremented from a starting byte position of a memory buffer.

The wireless handler stores the fragment in a corresponding slot in the portion of the memory (1004). The portion of the memory may be a contiguous memory region spanning a start byte address and end byte address. The start byte address is a number of bytes incremented from a beginning of non-volatile memory in a SoC. The sequence number attribute of the fragment corresponds to a specific byte-offset from the start byte address of the contiguous memory region. The wireless handler may determine whether the corresponding slot includes sufficient storage space, for example, in adjacent byte-locations. Wireless handler 350B slots remaining fragments, based on their sequence number attribute, to their appropriate byte-addresses within the portion of the memory.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. A first computing device of a multi-device system, comprising:
one or more first processors coupled to one or more memory devices; and
a supervisory processor configured to establish a plurality of virtual channels over a physical wireless channel between the first computing device and a second computing device of the multi-device system, wherein each of the virtual channels is associated with a different pair of processors comprising a source processor and a destination processor, wherein the source processor is selected from one of the first processors of the first computing device or second processors of the second computing device and the destination processor is selected from one of the first processors or the second processors, wherein, for each virtual channel and associated pair of processors, the source processor of the pair of processors is configured to communicate application data with the destination processor of the pair of processors using the virtual channel.

2. The first computing device of claim 1, wherein the supervisory processor is further configured to, for a first virtual channel of the virtual channels, allocate a portion of memory of the one or more memory devices for storing fragments of an application payload received as packets via the first virtual channel.

3. The first computing device of claim 1, further comprising:
a wireless handler configured to perform at least one of send, in a packet, a fragment of a first application payload on at least one virtual channel or receive, in a packet, a fragment of a second application payload on at least one other virtual channel.

4. The first computing device of claim 1, further comprising:
a wireless handler configured to generate packets from application data generated by a source processor of an associated pair of processors having a first virtual channel of the virtual channels.

5. The first computing device of claim 4, wherein each of the packets comprises:
at least one of source identifier for the source processor of the pair of processors and a destination identifier for the destination processor of the pair of processors, wherein the second computing device uses at least one of the source identifier or the destination identifier to identify allocated portion of memory in the second computing device.

6. The first computing device of claim 4, wherein each of the packets comprises:
a destination identifier for a destination processor of the pair of processors, wherein a wireless handler at the second computing devices uses the destination identifier to identify for the first virtual channel an allocated portion of memory in the second computing device.

7. The first computing device of claim 4, wherein each of the packets comprises:
a stream identifier for the first virtual channel, wherein the stream identifier corresponds to a portion of memory of the one or more memory devices, the portion of memory being allocated to store, for the source processor, incoming application data from a destination processor of the pair of processors.

8. The first computing device of claim 4, wherein each of the packets comprises:
a sequence number for a fragment of an application payload to be communicated in the packets via the first virtual channel, wherein the sequence number corresponds to a position of the fragment in the application payload.

9. The first computing device of claim 4, wherein each of the packets comprises:
a type attribute indicating whether the packets are to be fragmented or non-fragmented, wherein the type attribute further indicates whether an application payload to be communicated in the packets exceeded a size restriction.

10. The first computing device of claim 4, wherein each of the packets comprises:
a length attribute indicating a size restriction on an application payload to be communicated in the packets via the first virtual channel, wherein the length attribute further indicates a size of a portion of memory of the one or more memory devices for storing the application payload.

11. The first computing device of claim 1, further configured to:
allocate a portion of memory of the one or more memory devices for storing fragments of an application payload to be received via a virtual channel of the virtual channels;
receive, via the virtual channel, one or more wireless communications comprising at least one fragment of an application payload from the second computing device; and
store, in at least one slot of the portion of the shared memory, the at least one fragment of the application payload, the at least one slot having at least one location that corresponds to at least one sequence number of the at least one fragment in the application payload.

12. The first computing device of claim 1, further configured to:
generate header information for a plurality of fragments of an application payload to be transmitted on a first virtual channel of the virtual channels from a source processor of the first processors to a destination processor of the second processors; and
send, via the first virtual channel, the plurality of fragments to the second computing device of the multi-device system.

13. A method comprising:
establishing, by a supervisory processor, a plurality of virtual channels over a physical wireless channel between a first computing device and a second computing device of a multi-device system, wherein each of the virtual channels is associated with a different pair of processors comprising a source processor and a destination processor, wherein the source processor is selected from one of first processors of the first computing device or second processors of the second computing device and the destination processor is selected from one of the first processors or the second processors, wherein the first processors is coupled to one or more memory devices; and
for each virtual channel and associated pair of processors, communicating application data from the source processor of the pair of processors to the destination processor of the pair of processors using the virtual channel.

14. The method of claim 13, further comprising:
by the supervisory processor, allocating, for a first virtual channel of the virtual channels, a portion of memory of the one or more memory devices for storing fragments of an application payload received as packets via the first virtual channel.

15. The method of claim 14, further comprising:
allocating, by the supervisory processor of the first computing device, a portion of memory of the one or more memory devices for storing fragments of an application payload to be received via a virtual channel of the virtual channels;

receiving, by a wireless handler of the first computing device via the virtual channel, one or more wireless communications comprising at least one of the fragments from the second computing device; and storing, by the wireless handler of the first computing device, the at least one fragment of the plurality of fragments in at least one slot of the portion of the memory, the at least one slot having in the portion of the memory a location that corresponds to a position of the at least one fragment in the application payload.

16. The method of claim 14, further comprising:

generating, by a wireless handler of the first computing device, header information for a plurality of fragments of a second application payload for transmission to the second computing device of the multi-device system; and sending, by the wireless handler of the first computing device, the plurality of fragments to the second computing device of the multi-device system.

17. The method of claim 14, further comprising:

reading, by the wireless handler of the first computing device, at least one of a destination identifier for the destination processor or a source identifier for the source processor from header information in the packets; and identifying, by the wireless handler of the first computing device, the portion of memory for the virtual channel based on the at least one of the destination identifier for the destination processor or the source identifier for the source processor.

18. The method of claim 14, further comprising:

reading, by the wireless handler of the first computing device, a sequence number from header information in the packets; and identifying, by the wireless handler of the first computing device, a corresponding slot in the portion of memory for storing a fragment of the application payload.

19. The method of claim 13, wherein the virtual channel is associated with a set of features comprising an encryption policy, a security key-pair, and a quality of service.

20. A computer-readable medium comprising executable-instructions that, when executed by processing circuitry, cause a first computing device of a multi-device system to:

establish a plurality of virtual channels over a physical wireless channel between the first computing device and a second computing device of the multi-device system, wherein each of the virtual channels is associated with a different pair of processors comprising a source processor and a destination processor, wherein the source processor is selected from one of first processors of the first computing device and second processors of the second computing device and the destination processor is selected from one of the first processors or the second processors, wherein, for each virtual channel and associated pair of processors, the source processor of the pair of processors is configured to communicate application data with the destination processor of the pair of processors using the virtual channel, wherein the first processors is coupled to one or more memory devices.

* * * * *